(12) United States Patent
Crump et al.

(10) Patent No.: US 7,233,579 B1
(45) Date of Patent: Jun. 19, 2007

(54) ROUTING TABLE FOR FORWARDING INTERNET PROTOCOL (IP) PACKETS THROUGH A COMMUNICATIONS NETWORK

(75) Inventors: Richard Crump, Boston, MA (US); Janet Yung Doong, Chelmsford, MA (US); Shekhar Kshirsagar, Lexington, MA (US)

(73) Assignee: Nortel Networks Limited, St. Laurent (CA)

( * ) Notice: Subject to any disclaimer, the term of this patent is extended or adjusted under 35 U.S.C. 154(b) by 1145 days.

(21) Appl. No.: 10/327,341

(22) Filed: Dec. 20, 2002

(51) Int. Cl.
*H04L 12/28* (2006.01)

(52) U.S. Cl. ............... 370/256; 370/401; 370/392; 707/102

(58) Field of Classification Search ............... None
See application file for complete search history.

(56) References Cited

U.S. PATENT DOCUMENTS

| | | | |
|---|---|---|---|
| 6,141,738 A * | 10/2000 | Munter et al. | 711/206 |
| 6,442,561 B1 * | 8/2002 | Gehrke et al. | 707/102 |
| 6,490,592 B1 * | 12/2002 | St. Denis et al. | 707/102 |
| 6,680,916 B2 * | 1/2004 | Puleston | 370/254 |
| 6,876,655 B1 * | 4/2005 | Afek et al. | 370/392 |
| 7,111,071 B1 * | 9/2006 | Hooper | 709/238 |
| 2003/0031167 A1 * | 2/2003 | Singh et al. | 370/352 |

* cited by examiner

*Primary Examiner*—Duc Ho
(74) *Attorney, Agent, or Firm*—Guerin & Rodriguez, LLP; Michael A. Rodriguez

(57) ABSTRACT

Described are a system and computer-implemented method for searching and updating a routing table for forwarding IP packets through a communications network. Records containing IP address prefixes are organized in a binary tree data structure. When inserting a new record, one of the records in the binary tree data structure is identified as an enclosing record having an associated record data range that encloses record data of the new record. An enclosing pointer of the new record is set to point to the identified enclosing record. When searching for a longest matching prefix for a destination IP address, the binary tree data structure is traversed and one of the records in the binary tree data structure is identified as an enclosing record, which is returned as the longest matching prefix.

17 Claims, 11 Drawing Sheets

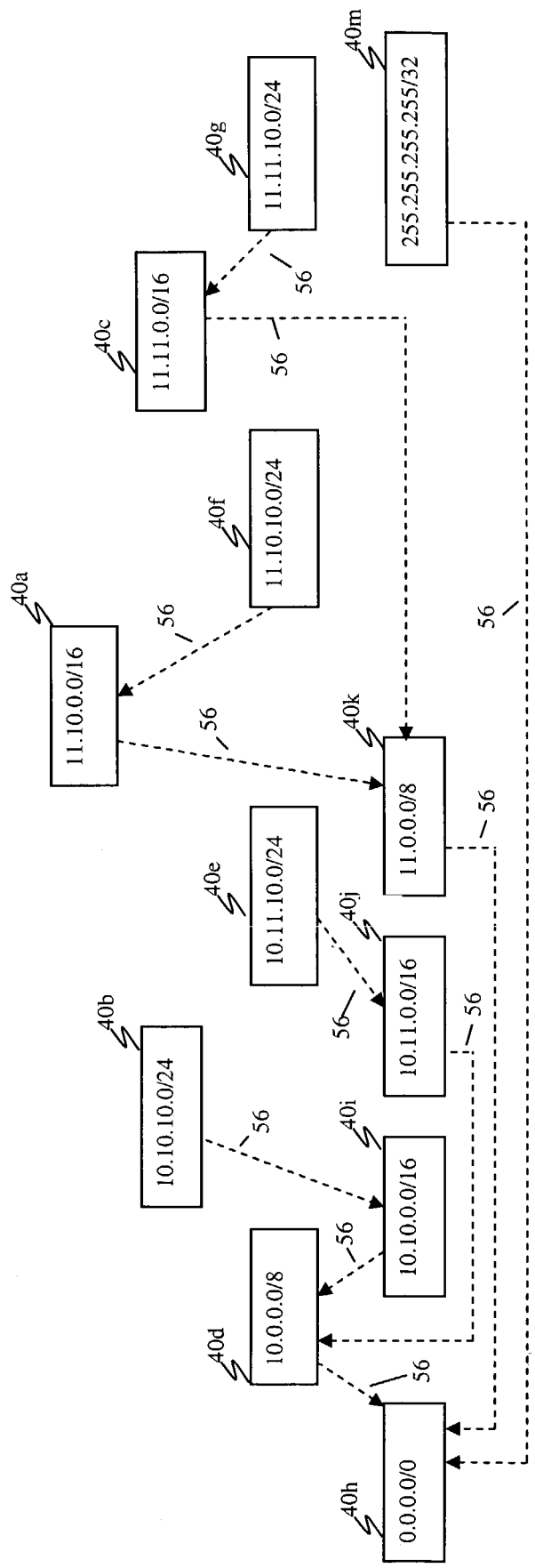
FIG. 5 (Enclosing Pointers)

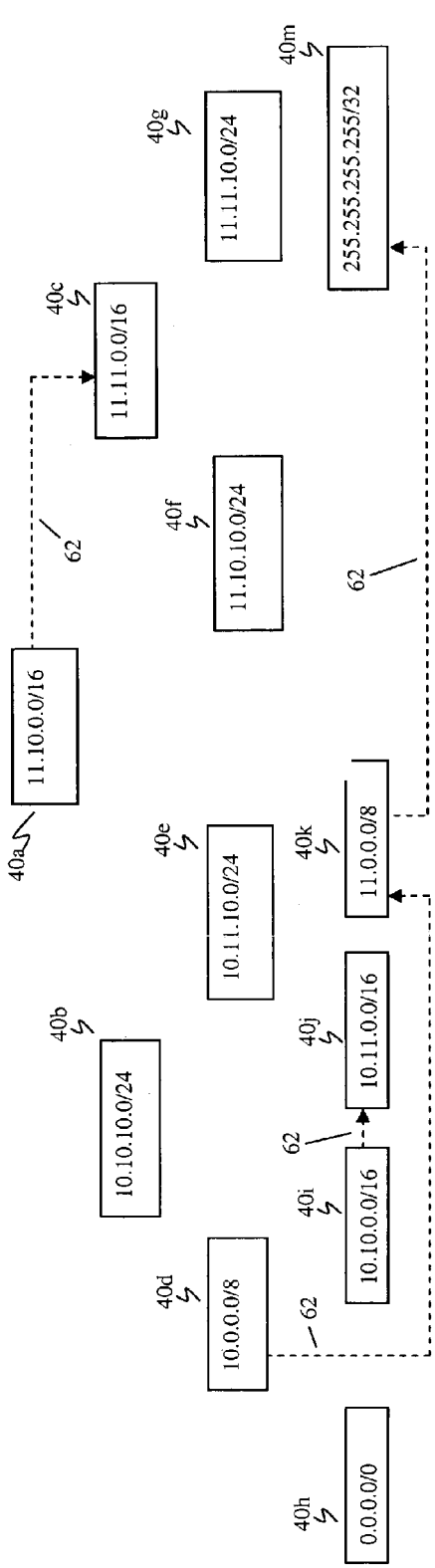
FIG. 6 (Neighboring Pointers)
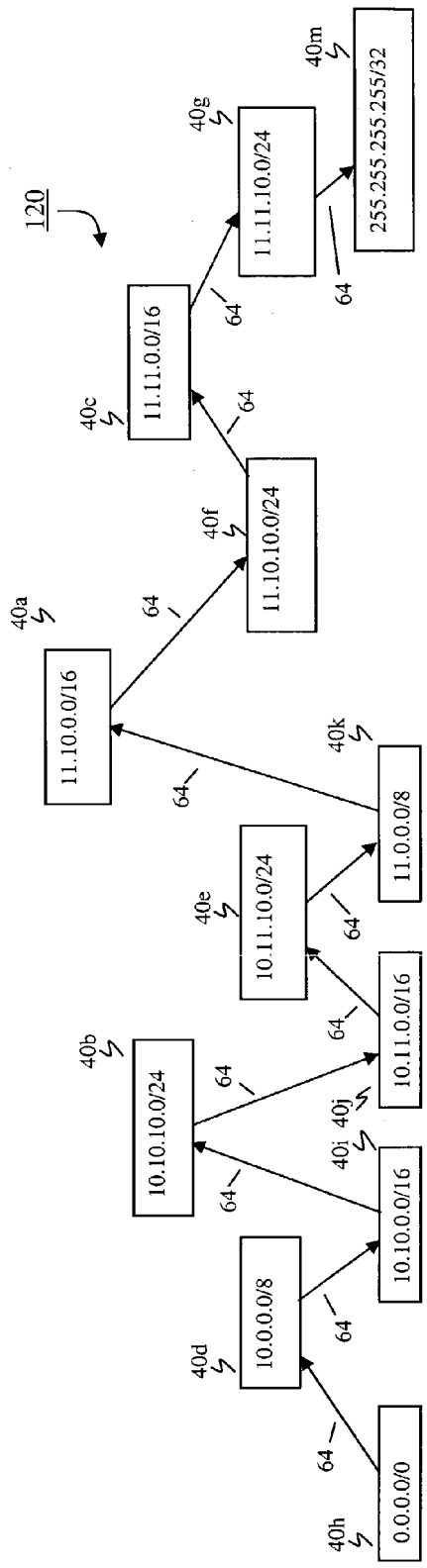
FIG. 7 (Next Pointers)

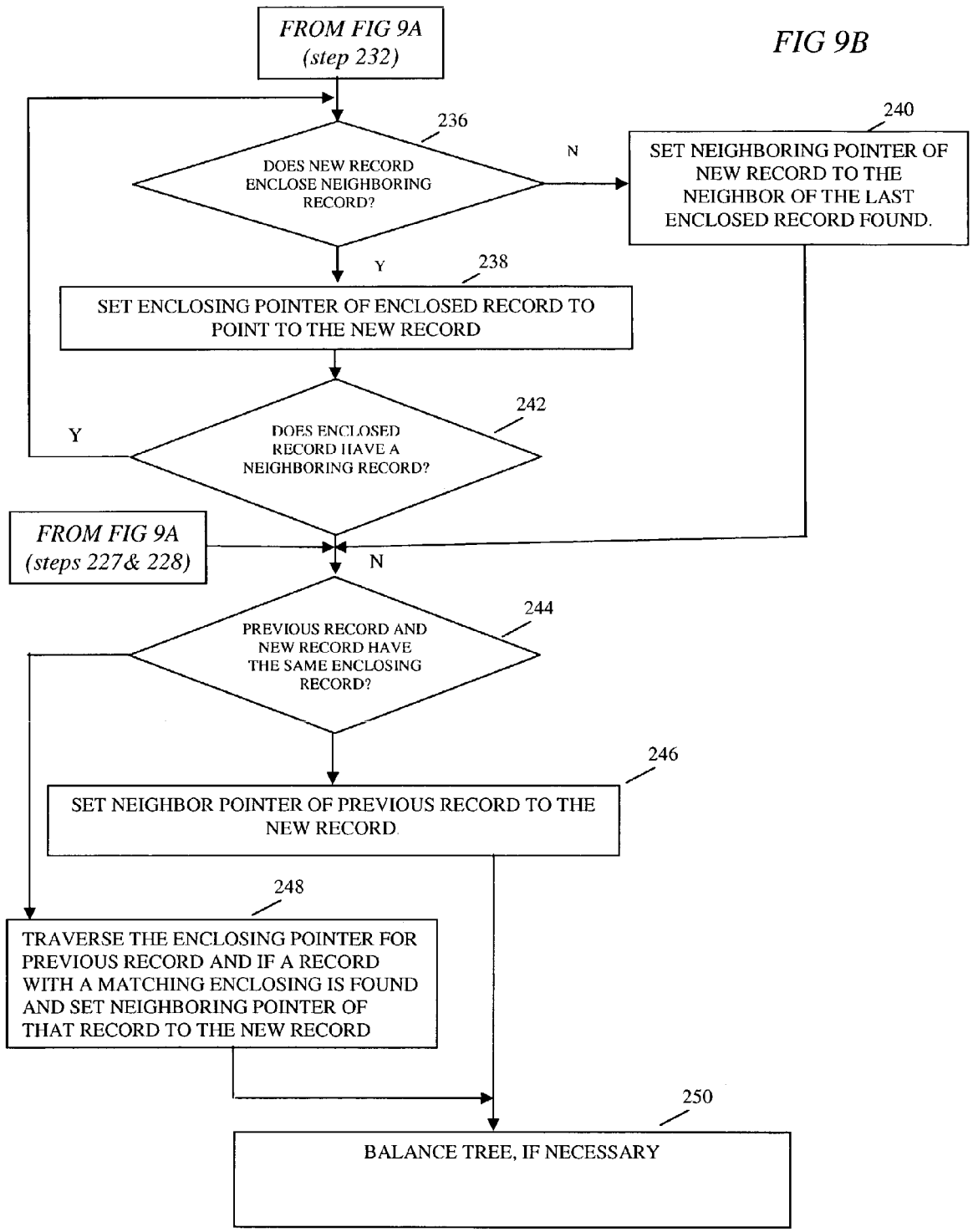

US 7,233,579 B1

ROUTING TABLE FOR FORWARDING INTERNET PROTOCOL (IP) PACKETS THROUGH A COMMUNICATIONS NETWORK

FIELD OF THE INVENTION

The invention relates generally to communications networks. More particularly, the invention relates to a system and method of implementing, searching and updating a routing table for forwarding communications in a communications network.

BACKGROUND

A current bottleneck in the performance of routers and switches operating on the Internet is Internet Protocol (IP) address lookup. The bottleneck is likely to worsen with increasingly larger routing tables, faster communication links, heavier packet traffic, and the migration from 32-bit Internet Protocol Version 4 (IPv4) addresses to 128-bit Internet Protocol Version 6 (IPv6) addresses. Consequently, it is becoming increasingly important for routers and switches to employ IP packet forwarding that can meet these increasing demands.

FIG. 1 shows an example of a communications network 10 having a router 20. The router 20 receives IP packets 22 from a node 12 (Node A) in the network 10. Each received IP packet 22 has a header 24, including a destination address field 26, and data 28. The destination address field 26 has an IP address of a node (or host) to which the IP packet 22 is targeted. With this IP address, the router 20 accesses a routing (or forwarding) table 32 to determine to which node (e.g., Node B, C, or D) to forward the IP packet 22. In general, the router 20 selects the node that advances the IP packet 22 towards its targeted destination.

A basic principle of IP addressing is that routers and switches can use the prefixes of an IP address to make routing decisions. A familiar dot-notation for a 32-bit IP address includes four decimal values separated by periods (e.g., 208.128.16.10). Each decimal value is represented by eight bits (a byte). The leftmost 16 bits of the IP address can, for example, identify a corporation, the leftmost 20 bits of the IP address an office in that corporation, the leftmost 24 bits a particular network (e.g., Ethernet) in that office, and all 32 bits a particular host device on that network.

One technique for using a routing table is longest prefix matching (LPM). When performing LPM, the router 20 compares the destination address 26 to entries in the forwarding table 32 to find the entry with the longest matching prefix. That entry indicates the location (or node) towards which to send the IP packet 22. For example, consider that the router 20 receives an IP packet 22 with a destination address 26 of 208.128.16.10 and upon searching the routing table 32 finds two entries with matching prefixes, the first entry being 208.128 and the second entry being 208.128.16. The router 20 then selects the second entry (208.128.16) because it is longer and more specific than the first entry.

One way to implement the LPM algorithm is to use a prefix tree (i.e., a binary tree) having a root node, intermediate nodes, and leaf nodes. The leaf nodes represent prefix entries in the forwarding table 32. The prefix tree is built only to the extent needed to represent all of the entries in the forwarding table 32. The router 20 searches for the longest prefix in the prefix tree that matches part of or the entire destination IP address 26 by traversing the prefix tree from root node to a leaf node, possibly passing through one or more intermediate nodes. Each traversed node adds a bit to the matching prefix. From a leaf node the router 20 obtains the forwarding location. A disadvantage of using a direct implementation of the prefix tree is that the process can require a traversal of as many nodes as there are bits in the IP address to obtain the forwarding location. Consequently, searching for the longest prefix match and updating the prefix tree can be slow.

Another implementation of a routing table uses a hash table of indexes and linked lists of entries. The entries of each linked list provide a range of prefix data, and each index points to a linked list. A general disadvantage with this implementation is that tuning the routing table to perform fast prefix searching slows the performance of table updates, and tuning the routing table to perform fast table updates slows the performance of prefix searching. Thus there is a need for a longest prefix matching implementation that can perform fast prefix searching and fast table updates without the performance tradeoff described above.

SUMMARY

In one aspect, the invention features a method of adding a new record to a plurality of records organized in a binary tree data structure. One of the records organized in the binary tree data structure is identified as an enclosing record having an associated record data range that encloses record data of the new record. An enclosing pointer of the new record is set to point to the identified enclosing record.

In another aspect, the invention features a method of determining a route for an IP packet having a destination IP address. A plurality of records is organized in a binary tree structure. Each record has record data that include an IP address prefix for use in routing IP packets. It is determined that the binary tree data structure lacks a given record with record data that match the destination IP address. One of the records organized in the binary tree data structure is identified as a previous record having record data that more closely precede in order the record data of the new record than any of the other records in the binary tree data structure. It is determined that the record data of the previous record are the longest matching prefix in the plurality of records for the destination IP address if the record data range associated with the record data of the previous record encloses the record data of the new record.

In another aspect, the invention features a record having record data. The record comprises an enclosing pointer for linking the record to an enclosing record in a data structure. The enclosing record has a record data range that encloses the record data of the record. The record also includes a neighboring pointer for linking the record to a neighboring record in the data structure. The neighboring record has record data that is greater than the record data of the record and is enclosed by the same enclosing record that encloses the record.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5 is a diagram showing the linking (i.e., enclosing pointers) between enclosing records for the same exemplary set of records of FIG. 2.

FIG. 6 is a diagram showing the linking (i.e., neighboring pointers) between neighboring records for the same exemplary set of records of FIG. 2.

FIG. 7 is a diagram showing the linking (i.e., next pointers) between next records for the same exemplary set of records of FIG. 2.

FIG. 9A and FIG. 9B are flow diagrams illustrating an embodiment of a process for inserting a record into the exemplary set of records shown in FIG. 2.

DETAILED DESCRIPTION

Figure 1:
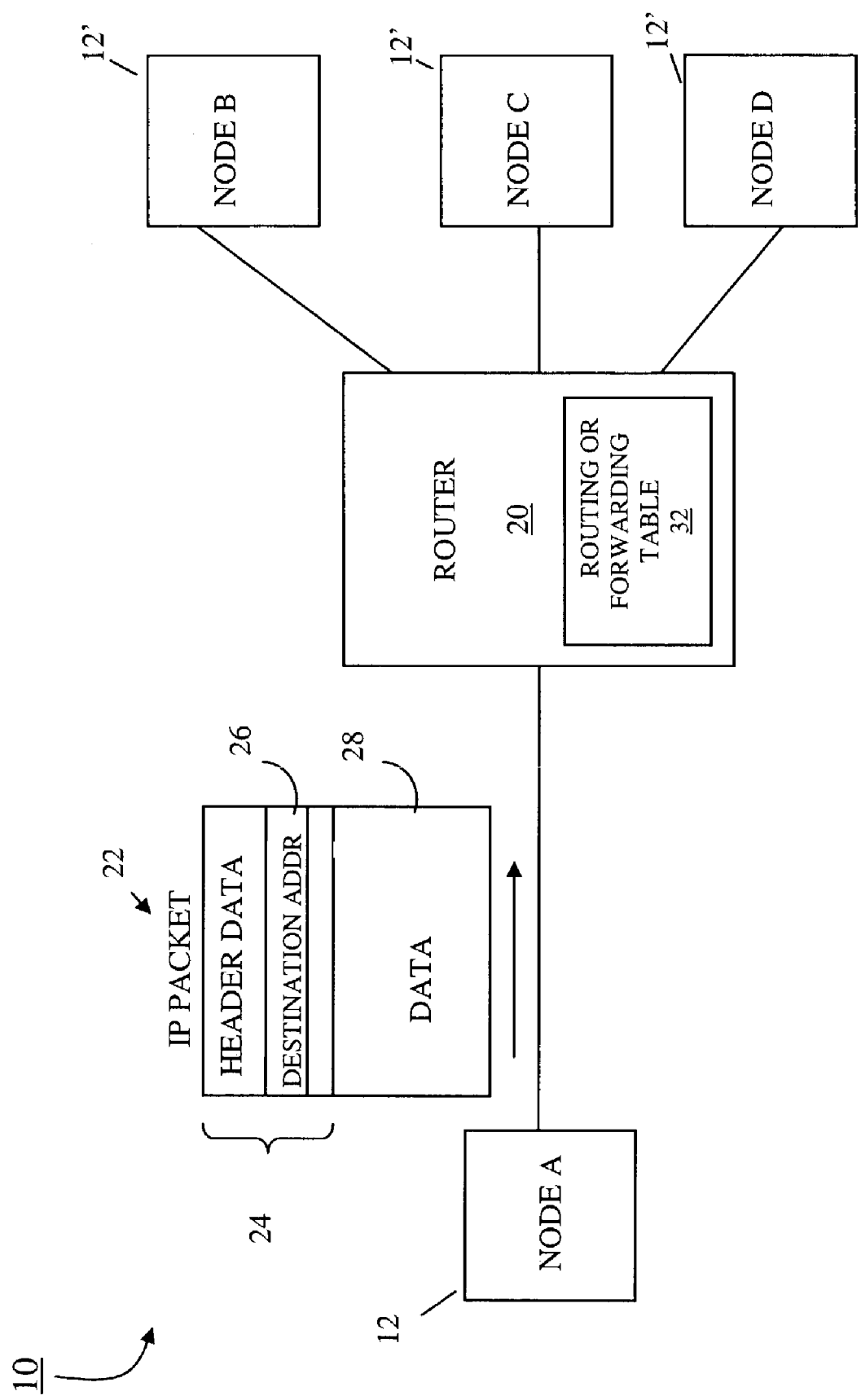
FIG. 1 is a diagram of a network including a router that forwards IP packets over the network according to a longest prefix matching method.
Figure 2:
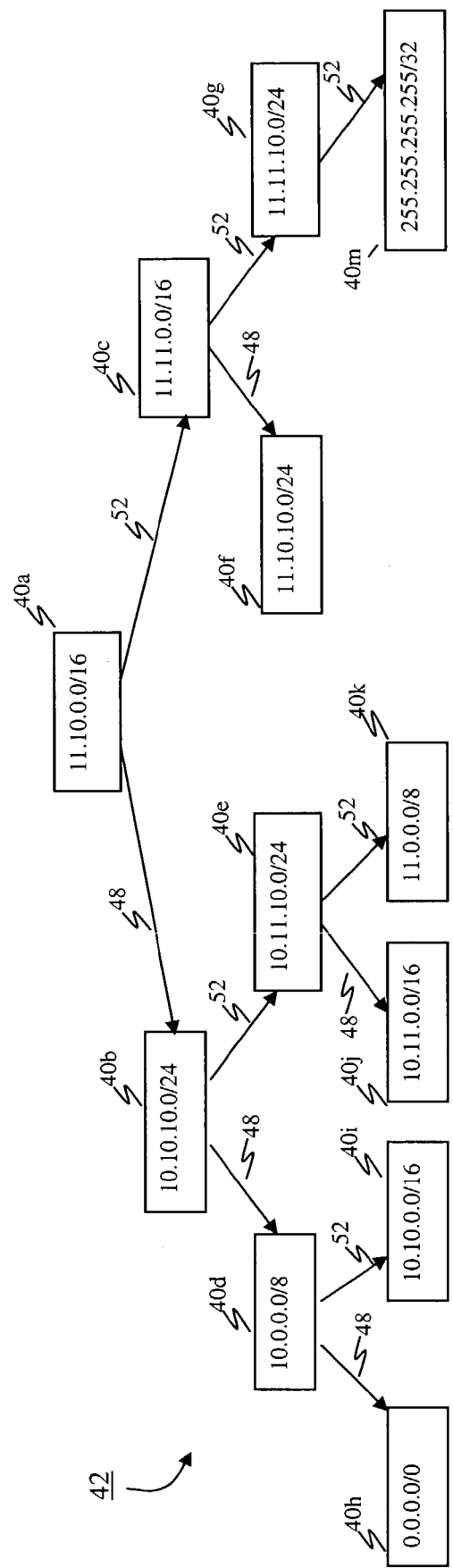
FIG. 2 is a diagram illustrating one exemplary set of records organized according to a search data structure, here an embodiment of a binary tree.

FIG. 2 shows an example set of records (generally, 40) organized in a binary tree 42. The particular records 40 in this exemplary record set and the order in which the records are arranged in the binary tree 42 are shown here for the purpose of illustrating the principles of the invention, and their use is not intended to limit the scope of the invention to this particular record set or arrangement. As described in more detail below, the binary tree 42 is the primary data structure used to search for an IP address prefix for routing an IP packet.

Each record 40 in the binary tree 42 has data (also, record data or search key) by which the records can be ordered and searched. In this example, the data in each record 40 includes an IP address prefix. For example, the record 40a is the root node of the binary tree 12 and has an IP address prefix of 11.10.0.0/16. Records 40 with a lower IP address prefix appear in a left sub-tree of the root node record and records 40 with a higher IP address prefix appear in the right sub-tree of the root node record. This pattern of lower IP address prefixes in the left sub-tree and higher IP address prefixes in the right sub-tree applies also to records at a lower level than the root node record (except for records that are leaf nodes, which have no sub-trees).

In the binary tree 42, each record 40 is linked to zero, one, or two other records by a left pointer 48, by a right pointer 52, by both left and right pointers, or by neither a left nor right pointer. In the particular example shown, the records 40h, 40i, 40j, 40k, 40m with record data of "0.0.0.0/0," "10.10.0.0/16," "10.11.0.0/16," "11.0.0.0/8," "255.255.255.255/32," respectively, are leaf nodes in the binary tree 42. In one embodiment, the binary tree 42 is an AVL (Adelson, Velskii, and Landis) tree (i.e., a binary tree in which the difference in height between the left and right sub-trees (or root node) is less than or equal to one). Although in the present example the IP address prefixes are for IPv4 addresses, the principles of the invention extend also to IPv6 addresses and to other types of data that are ordered and ranged (as described in more detail below).

A typical search for the longest matching prefix entails traversing through the levels of the binary tree 42 to find a record with record data that matches the destination IP address. An exact address match may not be found. To facilitate the search for the longest matching prefix, the present invention provides each record with an additional pointer (referred to as an enclosing pointer), as described in more detail below. Also, write processes can add records to the set of records. Accordingly, the present invention features additional pointers (referred to as a neighboring pointer and a next pointer), which, when used in conjunction with the enclosing pointer, produces faster record insertions than those of the prior art. Further, adding a record to (or deleting a record from) the set of records can cause an intermediate state to arise in the binary tree data structure (e.g., to rebalance the binary tree 42 after the insertion or deletion). Ordinarily, a locking mechanism is used to prevent other processes from accessing records affected by the intermediate state. In one embodiment the present invention employs the next pointer and an indicator to provide lock-free access to the records in the binary tree 42, when the binary tree 42 is in an intermediate state.

Figure 3:
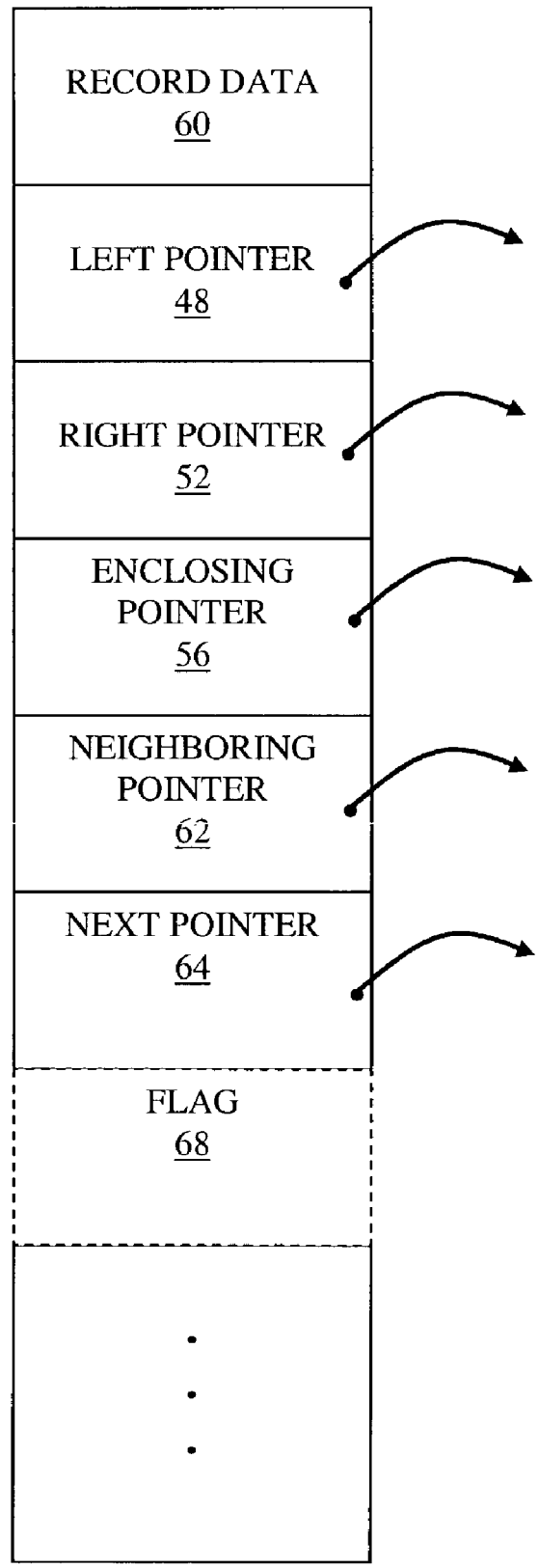
FIG. 3 is an embodiment of a data structure for each record in the set of records, each record having left, right, enclosing, neighboring, and next pointers.

FIG. 3 shows embodiments of a data structure for each record 40 of the present invention. One embodiment of each record 40 includes record data 60, a left pointer 48, a right pointer 52, an enclosing pointer 56, and a neighboring pointer 62. As described above, the record data 60 is the resource being managed and the means by which the records 40 are placed and searched for in the search data structure, such as the binary tree 42. For record data 60 that include an IP address prefix, each IP address prefix is associated with a range of prefixes. For example, an IP address prefix of 10.0.0.0/8 is associated with a range of prefixes from an upper endpoint of 10.0.0.0 to a lower endpoint of 10.255.255.255. As another example, an IP address prefix of 11.11.0.0/16 is associated with a range of prefixes from an upper endpoint of 11.11.0.0 to a lower endpoint of 11.11.255.255. The left pointer 48 and right pointer 52 provide the linkage for placing the record in the data structure of the binary tree 42.

The enclosing pointer 56 is for linking the record 40 to another record that has "enclosing" record data; that is, the record data of the pointed-to enclosing record have an associated range of values, and the record data of the enclosed record fall within this value range (including the range endpoints).

The neighboring pointer 62 points to a "neighbor" record, the neighbor record being a record that shares a common enclosing record and has record data associated with an adjacent non-overlapping higher range of values.

Each record 40 also includes a next pointer 64 for providing the linkage to place the record in a second search data structure, e.g., a linked list. The next pointer 64 is used for inserting records into the binary tree 42 and, in some embodiments, for providing an alternative search path through the second search data structure when the primary search data structure is in an intermediate state. In general, the next pointer 64 of a record 40 points to an enclosed record or to a record with record data of "higher" value. In embodiments that use the next pointer 64 to provide an alternative search path, each record 40 also includes a flag 68 (i.e., indicator), shown in dashed lines, which operates as a mechanism for indicating that the primary search data structure is in an intermediate state.

The following pseudo-code illustrates an example of a data structure for a record 40:

```
RECORD {
*left ptr;  /* point to left child node in tree */
*right ptr; /* point to right child node in tree */
*enclosing ptr; /* point to an enclosing node */
*neighboring ptr; /* point to a neighbor node */
*next ptr; /* point to next node in linked list */
record_data; /* resource being managed */
flag; /* optional: to indicate that the tree is in an inter-
    mediate state */
} RECORD
```

Figure 4:
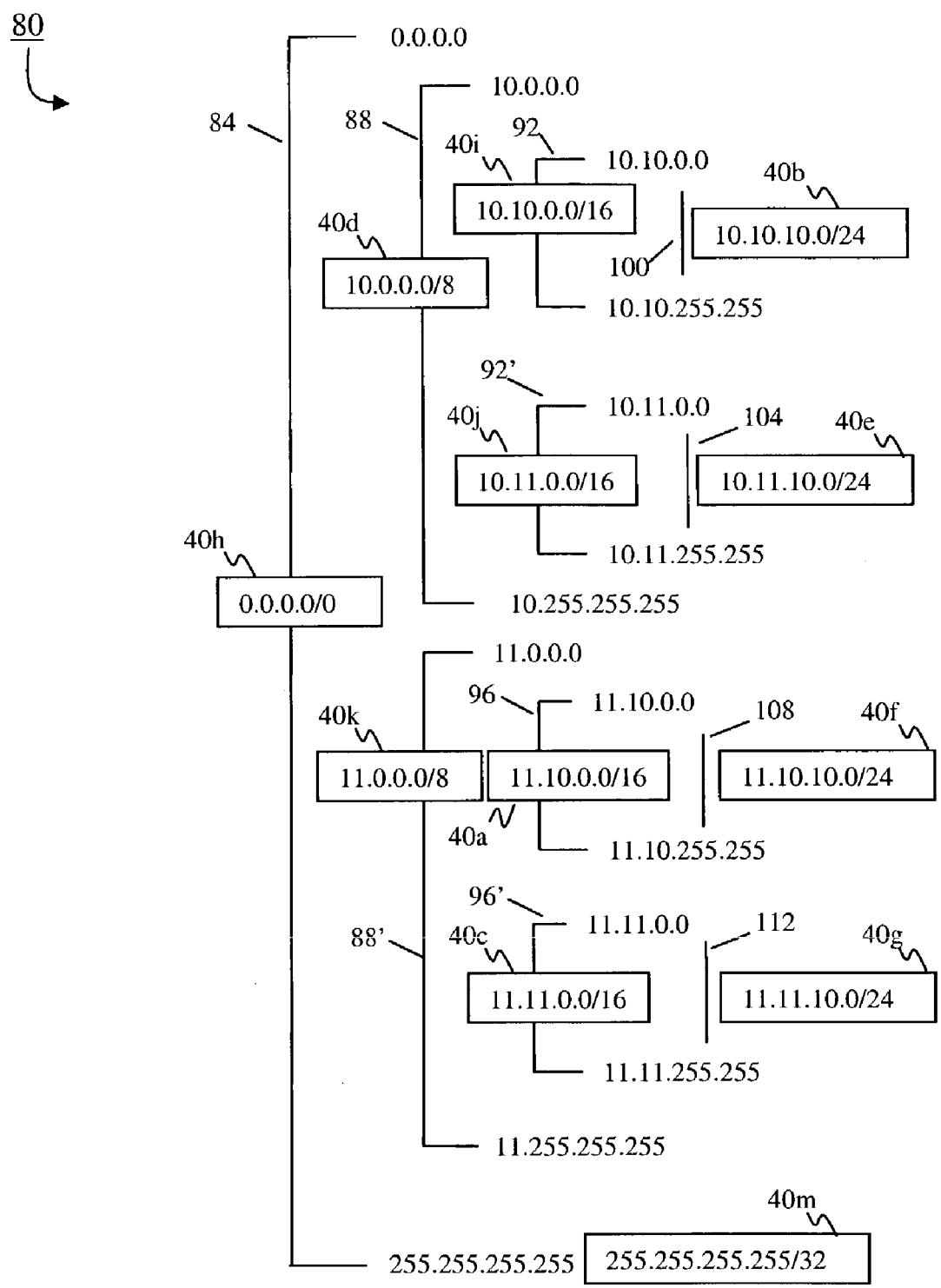
FIG. 4 is a diagram illustrating "enclosing" and "neighboring" relationships for the exemplary set of records in FIG. 2 based on the prefix information of those records.

FIG. 4 diagrammatically illustrates a hierarchy 80 for the exemplary set of records shown in FIG. 2 based on the record data (here, the IP address prefixes) of those records. Each record 40 in the hierarchy 80 has an associated prefix range, which is depicted in FIG. 4 by a bracket extending above and below the record 40 (i.e., specific reference numeral 84, 88, 88', 92, 92', 96, 96', 100, 104, 108, or 112). A first address prefix for the range appears at the top of each bracket, and the last address prefix for that range appears at the bottom of each bracket. For example, the first and last address prefixes for the record 40h with record data 0.0.0.0/0 are 0.0.0.0 and 255.255.255.255, respectively.

Some brackets (e.g., brackets 84 and 88, 88 and 96, 96 and 108) are nested and other brackets (e.g., brackets 88 and 88', 92 and 92', and 96 and 96') are adjacent to each other. Nested brackets show which records are enclosing records and adjacent brackets show which records are neighboring records. For example, the nested brackets 84, 88, 92 and 100 show that the record 40b is enclosed by the record data range of the record 40i, that the record 40i is enclosed by the record data range of the record 40d, and that the record 40d is enclosed by the record data range of the record 40h.

Note that although record 40h has a record data range that encloses the record 40i, record 40h is not an enclosing record of record 40i because there is an intervening enclosing record (here, record 40d). That is, as used herein an enclosing record is on the next higher level of the hierarchy 80 than the enclosed record. Also note that the record 40m (255.255.255.255/32) is deemed enclosed by the record data range of the record 40h. Generally, with the exception of the record 40h, each record 40 has one enclosing record. FIG. 5 shows the enclosing pointers 56 for the example set of records 40 shown in FIG. 4. The records 40 are in the same relative position in FIG. 5 as they are in FIG. 2 to facilitate a comparison between the left and right pointers 48, 52 of the binary tree 42 and the enclosing pointers 56.

Adjacent brackets show neighboring records. For example, brackets 96, 96' show that the record 40c is the neighboring record of record 40a. Note that, as used herein, the reverse is not true; that is, the record 40a is not the neighboring record of the record 40c. Both records 40a and its neighboring record 40c, have a common enclosing record 40k. As another example, the record 40j is the neighboring record of the record 40i, and both records 40j and 40i are enclosed by the record data range of enclosing record 40d. Generally, a record 40 has zero or one neighboring record, and each neighboring pointer 62 points to a neighboring record with record data of greater value. FIG. 6 shows the neighboring pointers for the example set of records 40 shown in FIG. 4. The records 40 are in the same relative position in FIG. 6 as they are in FIG. 2 to facilitate a comparison between the left and right pointers 48, 52 of the binary tree 42 and the neighboring pointers 62.

The present invention also arranges the records according to a second data structure to facilitate record insertion and, in one embodiment, to provide a second search data structure that is used when the primary search data structure is in an intermediate state. The second search data structure provides lock-free access to the records by one or more read processes while the primary search data structure is in the intermediate state because of a write process. A system and method for providing the lock-free access are described in a co-pending application titled "Concurrent Lock-Free Access to a Record by Write and Read Processes," to Crump et al., filed on Dec. 20, 2002, the entirety of which is incorporated by reference herein.

FIG. 7 shows one embodiment in which the second data structure is a linked list 120 formed of next pointers 64 of the example set of records 40 shown in FIG. 4. These next pointers 64 link the records 40 in ascending order based on the IP address prefixes of the records 40. Each record 40, except for the last record in the linked list 120, is linked to the following record 40 in the order by a next pointer 64. The next pointer 64 of the last record in the linked list (here, record 40m with record data 255.255.255.255/32) points to NULL (i.e., 0). Again, the records 40 are in the same relative position in FIG. 7 as they are in FIG. 2 to facilitate a comparison between the left and right pointers 48, 52 of the binary tree 42 and the next pointers 64.

Figure 8:
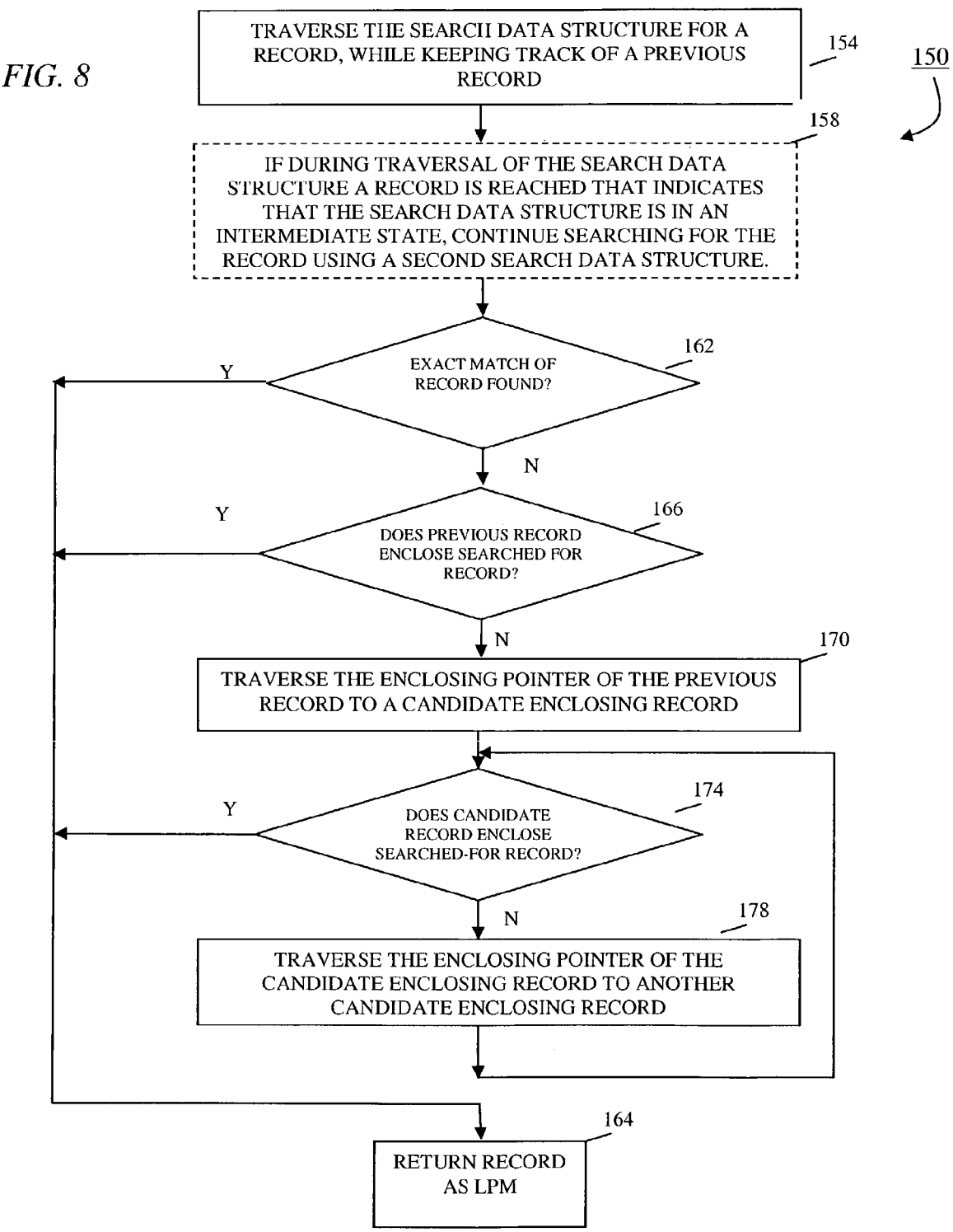
FIG. 8 is a flow diagram of an embodiment of a process of searching for and obtaining a longest matching prefix from a set of records.

FIG. 8 shows an embodiment of a process 150 of searching for a longest matching prefix for a destination IP address included in a received IP packet. At step 154, the primary search data structure (here, the binary tree 42 of FIG. 2) is traversed in a manner known in the art, in search of a record that has record data matching the destination IP address. Step 154 includes keeping track of a previous record. The process 150 updates the previous record whenever the search moves to a record in a right sub-tree, (the previous record remains unchanged when the search moves to a record in a left sub-tree). In one embodiment, the search for a matching record proceeds (step 158) along a search path determined by the second search data structure, if, during the traversing of the primary search data structure, a record is reached that indicates that the primary data structure is in an intermediate state (i.e., the flag 68 of that record is set).

If an exact match is found (step 162), the process 150 returns the record data of the matching record (step 164) as the longest matching prefix. The returned record data can also include routing information, such as the network route by which to forward the IP packet towards its destination.

If an exact match is not found (step 162), in the illustrated embodiment the process 150 examines (step 166) the record data of the previous record to determine if the associated record data range encloses the searched-for destination IP address. When the record data range of the previous record encloses the destination IP address, the process 150 returns the previous record (step 164) as the longest matching prefix.

If the record data range of the previous record does not enclose the destination IP address, the search follows (step 170) the enclosing pointer 56 of the previous record to a new candidate enclosing record. By following the enclosing pointer 56, the search traverses "up" one level in the hierarchy 80 shown in FIG. 4. Then the process 150 examines (step 174) the record data range of the candidate enclosing record to determine if the data range encloses the destination IP address. The process 150 returns (step 164) the candidate enclosing record as the longest matching prefix if its record data range encloses the destination IP address. Otherwise, the search moves up another level in the hierarchy 80 by following the enclosing pointer 56 of the candidate enclosing record (step 178) to another candidate enclosing record, and the record data range evaluation occurs again (step 174). The pattern of traversing the enclosing pointer 56 and evaluating the data range (steps 178 and 174) repeats until the process 150 finds and returns an enclosing record as the longest matching prefix. At worst case, the search for the longest matching prefix eventually rises to the top of the hierarchy 80 and returns the record 40*h* (0.0.0.0/0), which has a data range that spans all possible IP addresses (e.g., IPv4).

The process of searching is now illustrated by example. Consider a search for the longest matching prefix for a destination IP address of 10.10.11.8, using the binary search tree 42 and the set of records shown in FIG. 2. The search traverses, in order, the records 40*a*, 40*b*, 40*e*, and 40*j*, (11.10.0.0/16, 10.10.10.0/24, 10.11.10.0/24, and 10.11.0.0/16, respectively), to determine that a match of the searched-for IP address is not within the set of records. Because the record 40*j* is not an enclosing record for the searched-for IP address, the previous record is examined, which in this example is the record 40*b*. Record 40*j* is the previous record because it is the last record visited when the search last moved to a record in a right sub-tree.

The record data range for record 40*b* (i.e., 10.10.10.0/0 to 10.10.10.255), also does not enclose the searched-for IP address of 10.10.11.8, so the search follows the enclosing pointer 56 of the previous record 40*b* to the record 40*i* (see FIG. 5). The record data range for the record 40*i* (i.e., 10.10.0.0/0 to 10.10.255.255) encloses the searched-for IP address of 10.10.11.8 and is therefore returned as the longest matching prefix.

Figure 9A:
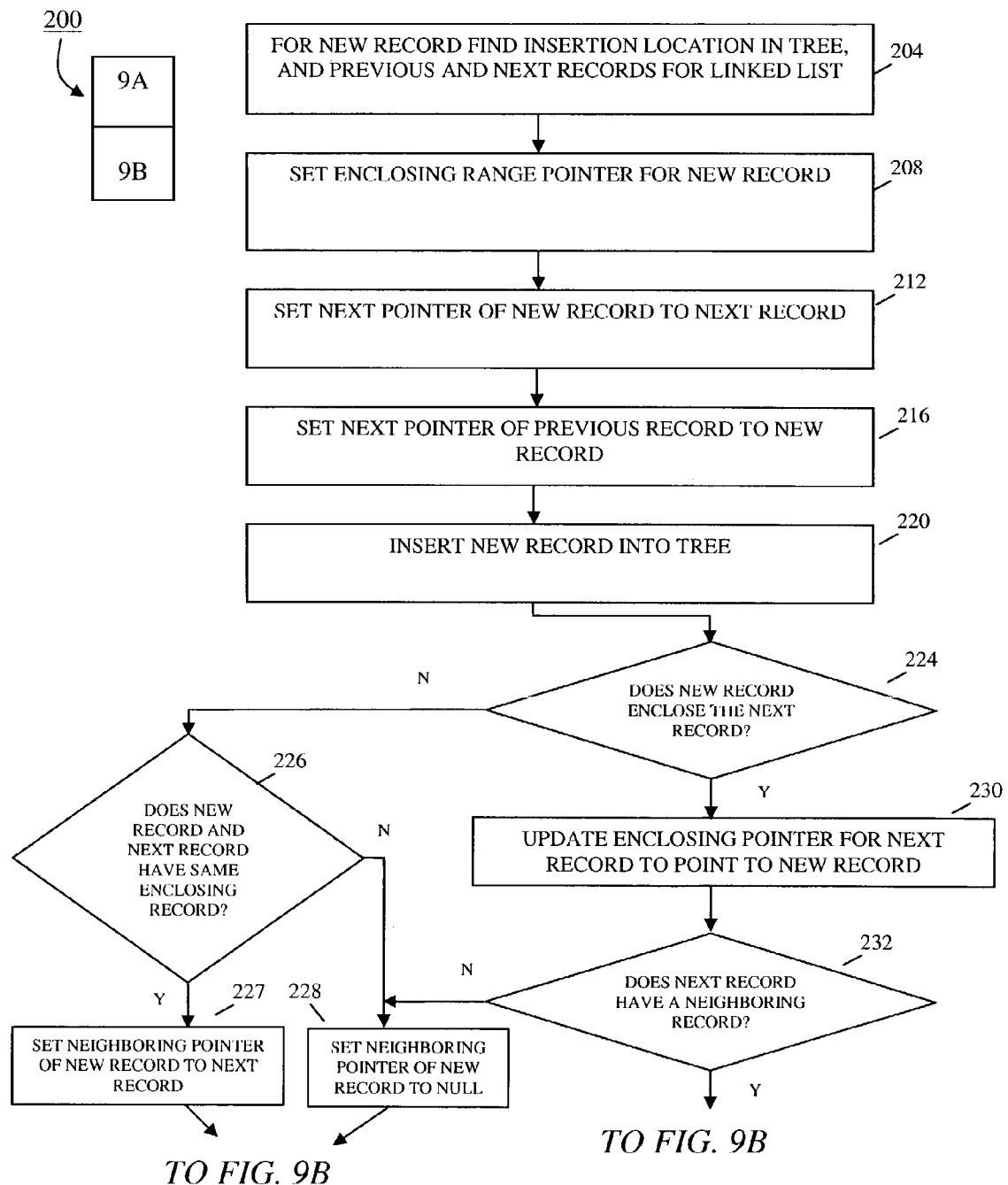

FIG. 9A and FIG. 9B illustrate an embodiment of a process 200 for inserting a new record into the exemplary binary tree 42 shown in FIG. 2. In brief overview, the process 200 involves various phases: (1) finding the enclosing record and setting the enclosing pointer 56 for the new record to point to the enclosed record; (2) inserting the new record into the primary and second data structures; (3) finding each record enclosed by the new record, if any, and setting their enclosing pointers to point to the new record; (4) finding a neighboring record of the new record, if any, and setting the neighboring pointer 62 of the new record to point to that neighboring record; and (5) finding a record that has the new record as is its neighboring record, if any, and setting the neighboring pointer 62 of that record to point to the new record.

Specifically, the process 200 finds (step 204) an insertion location in the binary tree 42 for the new record. The insertion location is found by traversing the levels of the binary tree 42 using a binary tree traversal technique known in the art until the traversal reaches an appropriate record for linking to the new record. During the traversal of the binary tree, the identities of a current "previous record" and of a current "next record" are maintained. When the traversal moves to a record in a right sub-tree, the process 200 updates the current "previous record" to the record just visited (i.e., the record from which the traversal just moved). When the traversal moves to a record in a left sub-tree, the process 200 updates the current "next record" to be the record currently being visited.

At step 208, the process 200 determines the enclosing record for the new record and sets the enclosing pointer 56 of the new record to point to the enclosing record. To determine this enclosing record, the process 200 examines the previous record to determine if the record data range of the previous record encloses the record data of the new record. If the previous record is the enclosing record, the process 200 sets the enclosing pointer 56 to the previous record. Otherwise, the process 200 follows the enclosing pointer 56 of the previous record to another candidate enclosing record and examines the record data range of the candidate enclosing record to determine if it encloses the new record. If necessary, the process 200 continues to follow the enclosing pointer 56 of each candidate enclosing record that does not enclose the new record until a record is found that encloses the new record.

The process 200 then sets (step 212) the next pointer 64 of the new record to point to the next record determined during the tree traversal. At step 216, the next pointer of the previous record is then set to point to the new record. Steps 212 and 216 operate to insert the new record into the second search data structure (i.e., the linked list). At step 220, the new record is then inserted into the binary tree 42 at the insertion location determined at step 204.

The new record is examined (step 224) to determine if it encloses the next record. If the new record does not enclose the next record, this indicates that the new record does not enclose any records, and thus there are no enclosing pointers to update to point to the new record. Also the process 200 determines (step 226) if the new record and the next record are enclosed by the same enclosing record. If both the new and next records are enclosed by the same enclosing record, in step 227 the neighboring pointer 62 of the new record is set to point to the next record. Otherwise, the process 200 sets (step 228) the neighboring pointer 62 of the new record to NULL because the new record has no neighboring record. The process 200 then continues with step 244 in FIG. 9B. If, at step 224 above, the new record encloses the next record, the process 200 updates (step 230) the enclosing pointer 56 of the next record to point to the new record. Then the neighboring pointer 62 of the next record is followed (step 232). This neighboring pointer 62 either points to NULL, if the next record has no neighboring record, or to another record.

In the first instance, the new record has no neighboring record and the process 200 sets its neighboring pointer 62 to NULL (step 228). In the latter instance, the neighboring record of the next record is examined (step 236) to determine if the record data of the new record also encloses this neighboring record. The process 200 updates (step 238) the enclosing pointer of the neighboring record to point to the new record, if the new record encloses this neighboring record, or updates (step 240) the neighboring pointer 62 of the new record to point to this neighboring record, if the new record does not enclose the neighboring record.

Further, if the new record encloses this neighboring record (step 236), the neighboring pointer 62 of this enclosed neighboring record is followed to another record to determine if there is another record that is enclosed by the new record (step 242). If this neighboring pointer 62 is set to another record, then steps 236 and 240 or steps 236, 240 and 242 repeat, depending upon whether this other record is enclosed by the new record. In general, the neighboring pointer 62 of the new record is set to NULL or to the neighboring record of the last (highest record data value) record enclosed by the new record.

Referring to FIG. 9B, at step 244 the process 200 determines if the previous record and the new record have the same enclosing record (e.g., by comparing the records pointed to by enclosing pointers 56 of both the previous and new records). If the previous record and the new record have the same enclosing record, the neighboring pointer 62 of the previous record is set to point to the new record (step 246). If these records to not have the same enclosing record, the process 200 follows the enclosing pointer 56 of the previous record (and the enclosing pointer 56 of each subsequently visited record that does not have the same enclosing record as the new record). If, by traversing the enclosing pointers 56, the process 200 finds a record with the same enclosing record as the new record, the process 200 sets the neighboring pointer 62 of that record to point to the new record (step 248). At step 250, the process 200 balances the binary tree 42 if necessary.

Figure 10A:
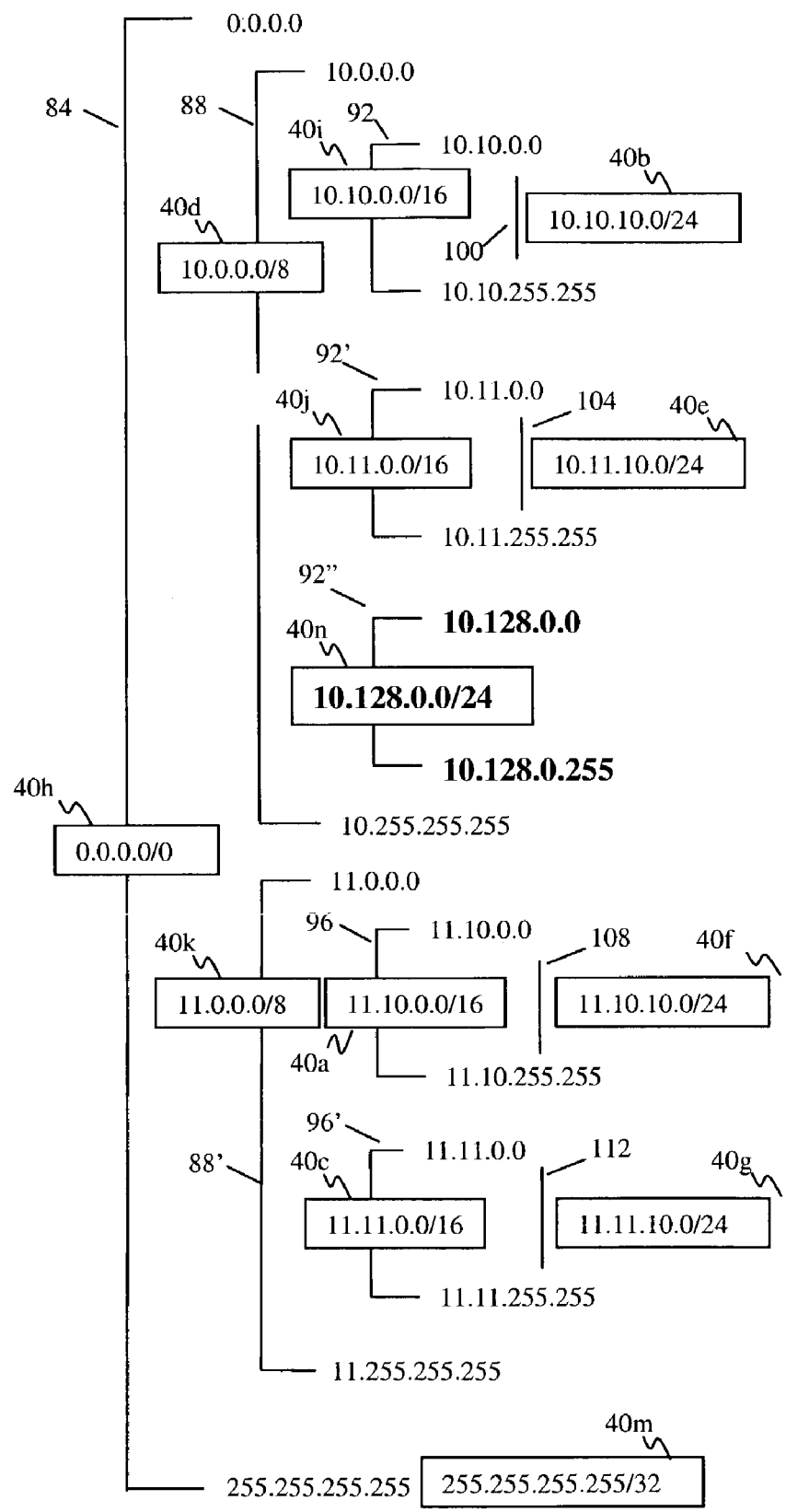
FIG. 10A and FIG. 10B are diagrams illustrating revised "enclosing" and "neighboring" relationships for the exemplary set of records in FIG. 2 after the insertion of two exemplary records.

The process 200 of inserting a new record into a set of records is now illustrated by example. Consider the insertion of a new record 40*n* having record data of 10.128.0.0/24, using the binary search tree 42 and the set of records shown in FIG. 2. FIG. 10A diagrammatically illustrates the hierarchy 80 of FIG. 4 with the new record (highlighted in bold). As shown, the new record 40*n* is enclosed by the record 40*d* (10.0.0.0/8) and is the neighboring record of the record 40*j* (10.11.0.0/16).

To find an insertion location for the new record 40*n* in the binary tree 42, the tree traversal visits the records 40*a*, 40*b*, 40*e*, and 40*k* (11.10.0.0/16, 10.10.10.0/24, 10.11.10.0/24, and 11.0.0.0/8, respectively), in this order, to determine that the new record 40*n* is to be inserted in the left sub-tree of the record 40*k*. During the traversal, the process 200 determines the previous record to be the record 40*e* because this record is the last record from which the traversal moved to a record in a right sub-tree. Also, the next record is the record 40*k* because this record is the last record from which the traversal moved to a record in a left sub-tree (in this example, the record 40*k* is considered the next record because the new record 40*n* is to be inserted into the left sub-tree of record 40*k*).

Because the record 40*k* is not an enclosing record for the new record 40*n*, the previous record 40*e* is examined to determine if it is an enclosing record. Because the record 40*e* is also not an enclosing record for the new record 40*n*, the process 200 follows the enclosing pointer of the previous record 40*e* to the record 40*j* (see FIG. 5), which also does not enclose the new record 40*n*. Similarly, the enclosing pointer of the record 40*j* is then followed to the record 40*d*, which does enclose the new record 40*n*. Consequently the enclosing pointer 56 of the new record 40*n* is set to point to the enclosing record 40*d*.

The next pointer 64 of the new record 40*n* is set to the next record, here the record 40*k*, and the next pointer 64 of the previous record 40*e* is set to point to the new record 40*n*. The new record 40*n* is then inserted into the binary tree 42 as a leaf node in the left sub-tree of the record 40*k*. Also, the neighboring pointer 62 of the new record is set to NULL because the new record does not enclose the next record, and because the previous record and the new record do not have the same enclosing record, the process 200 follows the enclosing pointer 56 of the previous record to the record 40*j* (see FIG. 5) and sets the neighboring pointer 62 of the record 40*j* to point to the new record 40*n* because the record 40*j* and the new record 40*n* have the same enclosing record 40*d*. Balancing of the binary tree 42 may occur, if necessary.

Figure 10B:
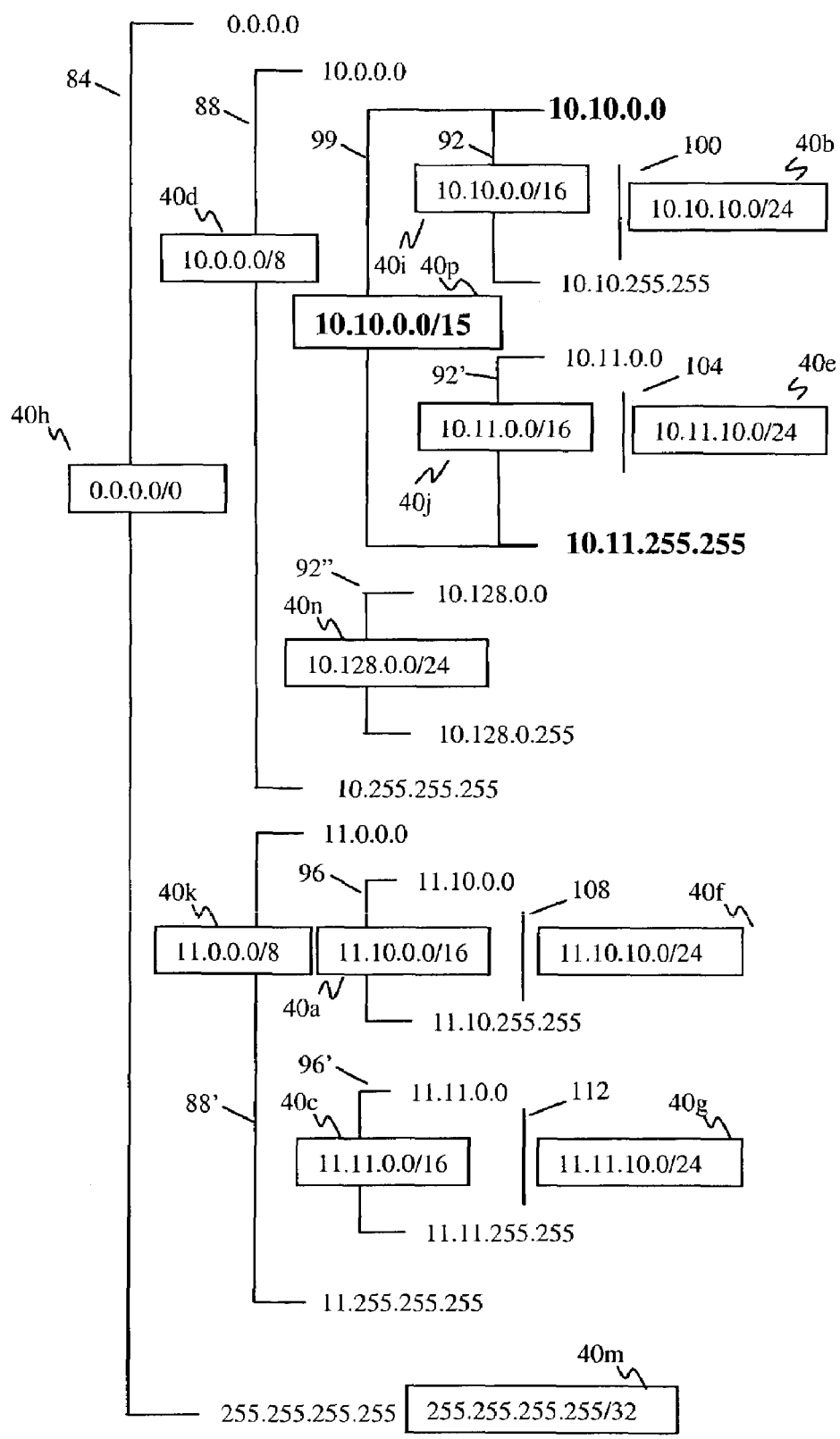

The process 200 of inserting a new record is further illustrated by another example. Consider the insertion of a record 40*p* with record data of 10.10.0.0/15 into the set of records shown in FIG. 2, which also includes the record 40*n* added in the previous example. FIG. 10B diagrammatically illustrates the hierarchy 80 of FIG. 4 with the new record 40*p* (highlighted in bold). As shown, the new record 40*p* is enclosed by the record 40*d* and has the record 40*n* for a neighboring record.

To find an insertion location for the new record in the binary tree 42, the tree traversal visits, in order, the records 40*a*, 40*b*, 40*d*, 40*i* (11.10.0.0/16, 10.10.10.0/24, 10.0.0.0/8, and 10.10.0.0/16), to determine that the new record 40*p* is to be inserted in the left sub-tree of the record 40*i*. During the traversal, the process 200 determines the previous record to be the record 40*d* and the next record to be the record 40*i*.

Because the record 40*i* is not an enclosing record for the new record 40*p*, the process 200 examines the previous record 40*d* to determine if it is an enclosing record, which it is, and therefore sets the enclosing pointer 56 of the new record 40*p* to point to the enclosing record 40*d*.

The next pointer of the new record 40*p* is set to the next record, here the record 40*i*, and the next pointer of the previous record 40*d* is set to point to the new record 40*p*. The new record 40*p* is then inserted into the binary tree 42 as a leaf node in the left sub-tree of the record 40*i*.

Because the new record 40*p* encloses the next record 40*i*, the process 200 follows the neighboring pointer of the next record 40*i* to the record 40*j*. The process 200 then sets the enclosing pointer 56 of the record 40*j* to point to the new record 40*p* because the new record 40*p* also encloses the record 40*j*. Then the neighboring pointer 62 of the record 40*j* is followed to the record 40*n*. Because this record 40*n* is not enclosed by the new record 40*p*, the neighboring pointer 62 of the new record 40*p* is set to point to the record 40*n* and the neighboring pointer 62 of the record 40*j* is set to NULL.

Because the previous record 40*d* and the new record 40*p* do not have the same enclosing record, the enclosing pointer 56 of the previous record 40*d* is followed to the record 40*h* (see FIG. 5), which also does not have the same enclosing record as the new record 40*p*. Thus, no neighboring pointer 62 points to the new record 40*p*. If necessary, the process 200 balances the binary tree 42.

While the invention has been shown and described with reference to specific preferred embodiments, it should be understood by those skilled in the art that various changes in form and detail may be made therein without departing from the spirit and scope of the invention as defined by the following claims. For instance, although the invention is described with specific reference to IP address prefixes, the principles of the invention can be applied to other types of record data (strings, numeric, alphanumeric), provided the record data values permit records to be placed into an order, and are associated with data ranges that permit records to be nested or to be adjacent to each other as described above.

What is claimed is:

1. A method of adding a new record to a plurality of records organized in a binary tree structure, the method comprising:
   identifying one of the records organized in the binary tree structure as an enclosing record having an associated record data range that encloses record data of the new record;
   setting an enclosing pointer of the new record to point to the identified enclosing record; and
   identifying one of the records organized in the binary tree structure as a neighboring record of the new record, and setting a neighboring pointer of the new record to point to the neighboring record.

2. The method of claim 1, further comprising identifying each record organized in the binary tree structure with record data that are enclosed by a record data range associated with the record data of the new record, and setting an enclosing pointer of each identified enclosed record to point to the new record.

3. The method of claim 1, further comprising organizing the plurality of records according to a second data structure, inserting the new record into an insertion location in the second data structure, and inserting the new record into an insertion location in the binary tree structure.

4. The method of claim 1, wherein the record data of the new record include an IP address prefix.

5. The method of claim 1, further comprising identifying one of the records organized in the binary tree structure as a previous record having record data that more closely precedes in order the record data of the new record than any of the other records in the binary tree data structure.

6. The method of claim 5, further comprising setting a next pointer of the previous record to point to the new record.

7. The method of claim 5, wherein the step of identifying the enclosing record includes determining whether a record data range associated with the record data of the previous record encloses the record data of the new record.

8. The method of claim 5, wherein the step of identifying the enclosing record includes following an enclosing pointer of the previous record to a candidate enclosing record in the binary tree structure if the record data range associated with the record data of the previous record does not enclose the record data of the new record.

9. The method of claim 1, further comprising identifying one of the records organized in the binary tree structure as a next record having record data that more closely follows in order the record data of the new record than any other record in the binary tree data structure.

10. The method of claim 9, further comprising setting a next pointer of the new record to point to the next record.

11. The method of claim 9, further comprising setting an enclosing pointer of the next record to point to the new record if a record data range associated with the record data of the new record encloses record data of the next record.

12. The method of claim 9, further comprising traversing a neighboring pointer of the next record to a neighboring record.

13. The method of claim 12, further comprising setting an enclosing pointer of the neighboring record to point to the new record if a record data range associated with the record data of the new record encloses record data of the neighboring record.

14. A method of determining a route for an IP packet having a destination IP address, the method comprising:

organizing a plurality of records in a binary tree structure, each record having record data that include an IP address prefix for use in routing IP packets;

determining that the binary tree structure lacks a given record with record data that match the destination IP address;

identifying one of the records organized in the binary tree structure as a previous record having record data that more closely precede in order the record data of a new record than any of the other records in the binary tree structure; and determining that the record data of the previous record are the longest matching prefix in the plurality of records for the destination IP address if the record data range associated with the record data of the previous record encloses the record data of the new record.

15. The method of claim 14, further comprising traversing an enclosing pointer from the previous record to a candidate enclosing record if the record data range associated with the record data of the previous record does not enclose the record data of the new record.

16. The method of claim 15 further comprising determining that the record data of the candidate enclosing record is the longest matching prefix in the plurality of records for the destination IP address if a record data range associated with the record data of the candidate enclosing record encloses the record data of the new record.

17. The method of claim 14, further comprising searching for the given record along a search path determined by the binary tree structure until a record is accessed that indicates that the binary tree structure is in an intermediate state, and searching for the given record along a second search path determined by the second data structure in response to the record that indicates that the binary tree structure is in an intermediate state.

* * * * *